US012687258B2

(12) United States Patent
Nomen Calvet et al.

(10) Patent No.: US 12,687,258 B2
(45) Date of Patent: Jul. 21, 2026

(54) LNG REGASIFICATION DEVICE AND COGENERATOR OF COLD WATER AND COLD DRY AIR

(71) Applicants: WGA WATER GLOBAL ACCESS, SL, Sispony (AD); Juan Eusebio Nomen Calvet, L'Aldosa (AD); Dan Alexandru Hanganu, Barcelona (ES)

(72) Inventors: Juan Eusebio Nomen Calvet, L'Aldosa (AD); Dan Alexandru Hanganu, Barcelona (ES)

(73) Assignees: WGA WATER GLOBAL ACCESS, SL (AD); Juan Eusebio Nomen Calvet (AD); Dan Alexandru Hanganu (ES)

( * ) Notice: Subject to any disclaimer, the term of this patent is extended or adjusted under 35 U.S.C. 154(b) by 400 days.

(21) Appl. No.: 18/044,846

(22) PCT Filed: Sep. 10, 2021

(86) PCT No.: PCT/ES2021/070655
§ 371 (c)(1),
(2) Date: Mar. 10, 2023

(87) PCT Pub. No.: WO2022/053733
PCT Pub. Date: Mar. 17, 2022

(65) Prior Publication Data

US 2023/0375137 A1 Nov. 23, 2023

(30) Foreign Application Priority Data

Sep. 11, 2020 (ES) ............................ ES202031986U

(51) Int. Cl.
*F17C 9/02* (2006.01)
*F25B 19/00* (2006.01)
*F25D 21/14* (2006.01)

(52) U.S. Cl.
CPC .............. *F17C 9/02* (2013.01); *F25B 19/005* (2013.01); *F25D 21/14* (2013.01); *F17C 2223/0161* (2013.01); *F17C 2225/0123* (2013.01)

(58) Field of Classification Search
CPC .. F17C 5/00; F17C 13/001; F17C 2203/0391; F17C 2221/013; F17C 2221/014;
(Continued)

(56) References Cited

U.S. PATENT DOCUMENTS

| | | | | |
|---|---|---|---|---|
| 4,226,605 A * | 10/1980 | Van Don | F02G 5/00 126/19.5 |
| 9,103,497 B1 * | 8/2015 | Bernert, Jr. | F24F 12/001 |

(Continued)

FOREIGN PATENT DOCUMENTS

| | | |
|---|---|---|
| CN | 104048161 A | 9/2014 |
| CN | 105509523 A | 4/2016 |

(Continued)

OTHER PUBLICATIONS

International Search Report for PCT/ES2021/070655, Prepared by the Spanish Patent Office, Mailing date Dec. 1, 2021, 7 pages including English translation.

(Continued)

*Primary Examiner* — Joel M Attey
*Assistant Examiner* — Ibrahim A. Michael Adeniji
(74) *Attorney, Agent, or Firm* — Snell & Wilmer LLP

(57) ABSTRACT

A device for regasification of LNG, and cogeneration of fresh water and dry air, having a casing hermetically sealed from the exterior withstanding vacuum conditions, and containing a working fluid in its liquid and gaseous phases; the casing is traversed by t a cryogenic tube through which LNG is fed and regasified natural gas is collected via the other end. The external surface of the cryogenic tube con- (Continued)

denses the gaseous working fluid, releasing energy, and evaporative condenser tubes located outside the casing, with the external condensing surface in contact with damp air, and the air vapor contained in the damp air condenses thereupon, generating cold fresh water and releasing energy to the working fluid in its liquid phase which flows through the evaporative condenser and which evaporates, generating a gaseous phase working fluid, which exits through the evaporative condenser and is directed into the casing for the condensation

15 Claims, 3 Drawing Sheets

(58) Field of Classification Search
CPC .... F17C 2223/0176; F17C 11/00; F25D 9/00; F25D 2303/0842; F25D 2303/085; F25D 2400/28; F25D 2400/30; F25D 3/10; F25D 3/12
See application file for complete search history.

(56) References Cited

U.S. PATENT DOCUMENTS

| | | | | |
|---|---|---|---|---|
| 2001/0008126 A1* | 7/2001 | Iwasaki | F17C 7/04 | 122/31.1 |
| 2007/0012050 A1* | 1/2007 | Brown | F17C 7/04 | 62/275 |
| 2009/0211263 A1* | 8/2009 | Coyle | F25J 3/0233 | 62/50.2 |
| 2010/0101240 A1* | 4/2010 | Mak | F17C 9/02 | 62/50.2 |
| 2012/0137718 A1* | 6/2012 | Uchida | H05K 7/20336 | 62/434 |
| 2014/0130521 A1 | 5/2014 | Mak | | |
| 2016/0146403 A1* | 5/2016 | Egashira | F17C 9/02 | 62/50.2 |

FOREIGN PATENT DOCUMENTS

| | | | |
|---|---|---|---|
| CN | 104428619 | A | 12/2016 |
| CN | 109716012 | A | 9/2021 |
| JP | 2005337336 | A | 12/2005 |
| JP | 2010203520 | A | 9/2010 |
| JP | 2014219047 | A | 11/2014 |
| WO | 2014075010 | A1 | 5/2014 |
| WO | 2018024921 | A1 | 2/2018 |

OTHER PUBLICATIONS

Japanese Office Action—Japanese Patent Application No. 2023-516130—with English translation, Sep. 5, 2025, 8 pages.
Chinese Office Action—Chinese Application No. 202180076045.5—with English translation, Apr. 1, 2025, 15 pages.
Chinese Office Action—Chinese Application No. 202180076045.5—with English translation, Aug. 13, 2025, 11 pages.
Chinese Office Action—Chinese Application No. 202180076045.5—with English translation, Dec. 1, 2025, 7 pages.

* cited by examiner

LNG REGASIFICATION DEVICE AND COGENERATOR OF COLD WATER AND COLD DRY AIR

CROSS-REFERENCE TO RELATED APPLICATION

This application is the U.S. national phase of PCT Application No. PCT/ES2021/070655 filed on Sep. 10, 2021 which claims priority to ES Patent Application No. U202031986 filed on Sep. 11, 2020, the disclosures of which are incorporated in their entirety by reference herein.

DESCRIPTION

Object

The present invention relates to a device for the regasification of liquefied natural gas and the cogeneration of cold fresh water and cold dry air.

State of the Art

Liquefied natural gas, LNG, regasification systems mainly use four energy sources:

1—Combustion of fossil fuels, with its well-known $CO_2$ emission problems,

2—Sensible heat of ambient air with the problem of the large size of the necessary installations and the problem of ice formation, 3—Sensible heat of seawater with the problems of corrosion, ice formation, direct mortality of marine life due to direct contact with the cold surfaces of the Open Rack Vaporizers ORV.

4—The latent heat of the water vapor contained in damp air and its sensible heat, with the CAPEX capital investment problem of the units published in patent PCT/ES2016/070589.

Specifically, patent PCT/ES2016/070589 discloses the problems perfectly described in the bibliography of the state-of-the-art, related to the regasification devices by air circulation, the problems related to the regasification devices by the supply of seawater on ORV and the problems related to the regasification devices by combustion of hydrocarbons. Patent PCT/ES2016/070589 discloses a tube and casing regasification device with a condenser conduit on its internal surface and an evaporator conduit on its external surface, inside which saturated air circulates. The problem with this device is the limitation in its production capacity and its capital cost since the entire bundle of tubes within which the damp air circulates is placed inside a casing. Limits on the casing diameter and the capital cost of this vacuum-tight casing limit the viability of this technology. In addition, the supply of the working fluid in liquid phase through the external wall of the evaporative condenser tube inside which the damp air circulates is complex and usually ends up forming a film of water or liquid working fluid and said liquid film limits the latent heat transfer coefficient, which requires multiplying the surface area of tubes with air inside and multiplying the diameter of the outer casing, this being a limiting factor for the viability of this technology.

All current technologies have, in practice, problems with the formation of ice on the LNG tube, which interferes with the energy supply process.

SUMMARY

The present invention seeks to solve one or more of the aforementioned drawbacks by means of a liquefied natural gas, LNG, regasification device, as defined in the claims.

The liquefied natural gas, LNG, regasification device allows the cogeneration of cold fresh water and cold dry air, using tubes or chambers for the exchange of latent heat and sensible heat, having an internal evaporative surface and an external condensing surface.

The regasification device comprises the following components:

At least one cryogenic conduit through which liquefied natural gas, hereinafter LNG, is fed via one of the ends and natural gas NG exits via the other end. This conduit can have flow control systems and security systems and, with the proper supply of external energy, it can maintain the thermal gradient up to a controlled temperature range within its wall, as the current Open Rack Vaporizers, ORV, do.

The at least one cryogenic conduit through which the LNG circulates and the resulting regasified NG exits are located inside at least one hermetic casing withstanding vacuum conditions inside which a working fluid coexists in liquid and gaseous phase. The gaseous phase of the working fluid condenses on the external surface of the LNG tube. The working fluid in liquid phase that is inside the casing is then supplied to the internal evaporative surface of the evaporative condenser tubes or chambers for the exchange of latent heat and sensible heat located outside the casing and which are under vacuum inside.

The evaporative condenser tubes or chambers for the exchange of latent heat and sensible heat are under vacuum inside. The evaporative condenser tubes or chambers for the exchange of latent heat and sensible heat are condensers on their external surface which is exposed to a flow of damp air at atmospheric pressure, and evaporators on their internal surface, on which a working fluid in liquid phase is supplied. The external condensing surface may be covered, at least in part, with a capillary structure of microslots, microgrooves, sintered wicks, or other capillary structure. A capillary structure is a structure designed in such a way that the fluid is dominated by the intermolecular forces of cohesion and adhesion such that the liquid-gas interface of the condensing fluid is curved along its entire length, with the intermolecular forces of cohesion and adhesion dominating. The internal evaporative surface may be covered, at least in part, with a capillary structure of microslots, microgrooves, sintered wicks, or other capillary structure in which pure water or other working fluid flows and evaporates in a capillary regime. The juxtaposition of an evaporative surface in a capillary regime and a condensing surface in a capillary regime, without forming water films, allows high latent heat transfer coefficients to be achieved and allows efficient sensible heat transfer.

The gaseous phase of the working fluid evaporated within the evaporative condenser tubes or chambers is directed into the casing within which there is at least one cryogenic tube into which the LNG that is converted into NG is fed.

A supply control system of LNG and working fluid vapor doses the fluid supplies so that there is a thermal gradient up to a controlled temperature inside the wall of the cryogenic tube.

The regasification device can be compartmentalized into a series of casings within which there are successive sections of at least one cryogenic tube and which work between different temperature ranges.

To avoid the formation of a solid phase of the working fluid in the regasification device, at least one heat pipe can be inserted between the at least one casing that contains the at least one LNG cryogenic tube and the container for the collection of vapor and excess liquid from the evaporative condenser tubes or chambers. The at least one heat pipe inserted allows the use of different working fluids with different solidification temperatures that prevent the solidification of the working fluid on the LNG cryogenic tube or on the condensing surface of another intermediate evaporative condenser tube or chamber and prevents the formation of ice on the external surface of the evaporative condenser tubes or chambers and allows the introduction of sensible heat exchangers to create stages of working temperatures.

BRIEF DESCRIPTION OF THE DRAWINGS

A more detailed explanation is given in the description that follows which is based on the attached figures.

DETAILED DESCRIPTION

Figure 1:
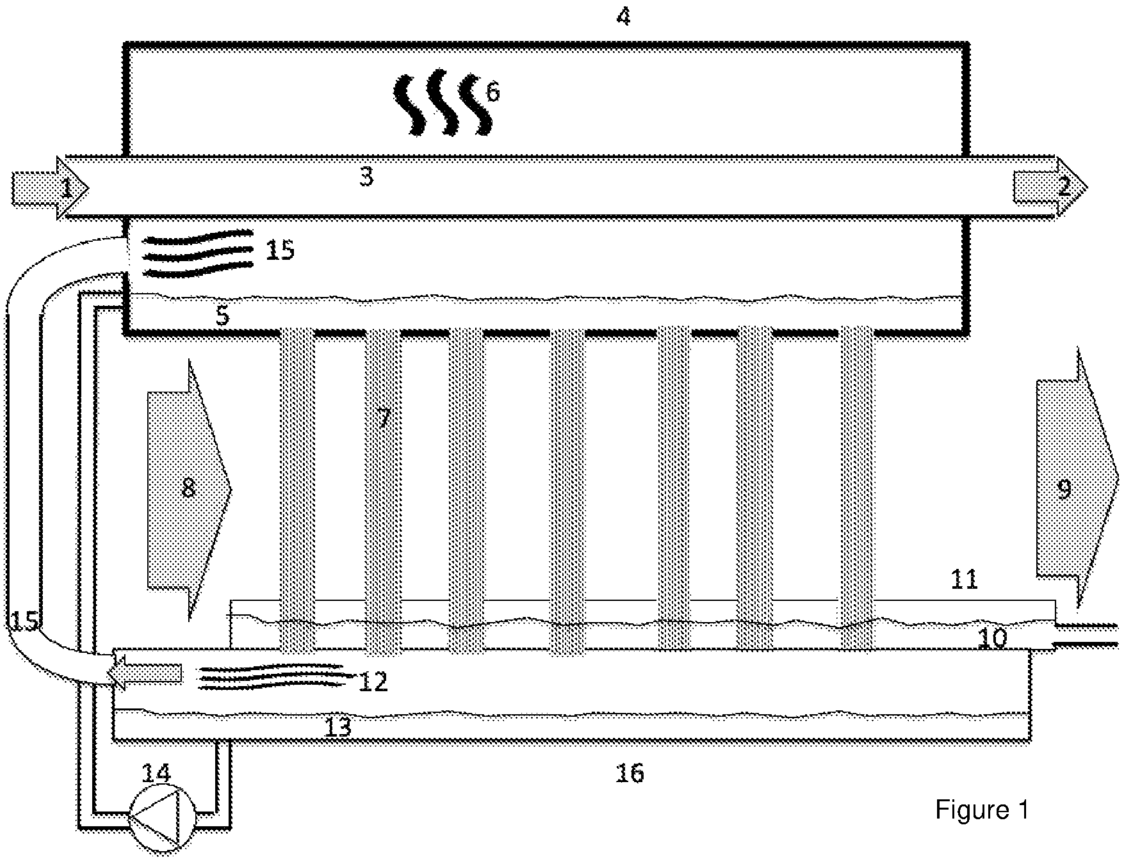
FIG. 1 shows a longitudinal cross section of a schematic representation of a regasification device.

As illustrated in FIG. 1, the regasification device for Liquefied Natural Gas, LNG, and the cogeneration of cold fresh water and cold dry air comprises, at least:

At least one LNG phase change cryogenic tube 3 through which liquefied natural gas LNG 1 is fed at one end and revaporized natural gas 2 is extracted at the other end. The internal surface of this tube is LNG evaporative and the external surface is a condenser. LNG phase-change cryogenic tubes are known and described in the state of the art. They are built of metals and sections appropriate to withstand the temperature differential to which they are subjected. These are tubes that, with the correct external supply of energy, have the capacity to maintain within their walls the thermal gradient between LNG and a controlled temperature on their external surface, as is the case with Open Rack Vaporizers used in LNG regasification and on which seawater at ambient temperature is currently poured.

At least one hermetic casing 4 that withstands vacuum conditions and is traversed by at least one cryogenic tube 3. Inside the at least one casing 4 there is a working fluid under vacuum conditions, part in liquid phase 5 and part in gaseous phase 6. This two-phase 5 and 6 working fluid can be pure water or an aqueous solution or other two-phase working fluid. Given the temperature gradient between the external surface of the at least one cryogenic tube 3 and the temperature of the working fluid in gaseous phase 6, the gaseous phase 6 of the working fluid condenses on the external surface of the at least one LNG tube 3. Upon condensing, the gaseous phase 6 of the working fluid releases energy in the form of latent heat of condensation and sensible heat that is absorbed by the LNG for its regasification process and for increasing the temperature of the natural gas that is generated. The liquid phase 5 of the working fluid accumulates at the bottom of the at least one casing 4.

The working fluid in liquid phase 5 is supplied to the internal evaporative surface of the evaporative condenser tubes or chambers 7 that are outside the at least one casing 4. The evaporative condenser tubes or chambers 7 are under vacuum conditions inside. Since the evaporative condenser tubes or chambers are outside the at least one casing 4, significant savings are achieved in the CAPEX capital cost of the at least one casing 4 and the interior volume of the at least one casing 4 ceases to be a limiting factor of the operating capacity of the device.

A current of damp air 8 that can be driven by at least one fan, blower or turbine 19 flows on the external surface of the evaporative condenser tubes or chambers 7. The water vapor contained in the flow of damp air 8 condenses on the external condensing surface of the evaporative condenser tubes or chambers 7, so that the water vapor condensed on the external surface of the evaporative condenser tubes or chambers 7 releases energy in the form of latent heat of condensation and sensible heat to the working fluid 5 that flows on the internal surface of the evaporative condenser tubes or chambers 7 that evaporates at least in part, generating a gaseous phase 12 that exits through one end of the evaporative condenser tubes or chambers 7. The condensed water 10 resulting from this process of condensation of the water vapor contained in the air flow 8 which is cold after the transfer of energy, flows through the external condensing surface of the evaporative condensers tubes or chambers 7 and accumulates inside an external collection container 11 and can be used as cold condensed water for municipal, agricultural or industrial uses. The flow of damp air 8 that flows through the external condensing surface of the evaporative condenser tubes or chambers becomes a flow of dry and cold air 9 that can be directed and used in refrigeration or air conditioning systems.

The outlet of the evaporative condenser tubes or chambers 7 is connected to a hermetic container 16, which is under vacuum conditions, for collecting fluids, in which the rest of the working fluid in the liquid phase 13 and the gaseous phase of the working fluid 12 evaporated on the internal evaporative surface of the evaporative condenser tubes or chambers 7 accumulate. The vapor 12 of the working fluid evaporated on the internal evaporative surface of the evaporative condenser tubes or chambers 7 is directed 15 to the inside of the at least one casing 4 where it will condense again on the external condensing surface of the at least one cryogenic tube 3. The rest of the liquid phase 13 of the working fluid accumulated inside the container 16 is pumped 14 to the interior of the at least one casing 4.

The device also includes a regulating system for the flow of LNG 1 that is fed into the cryogenic tube 3 and a regulating system for the flow of damp air 8 that is supplied on the external condensing surface of the at least one condenser-evaporator chamber and/or tube. These LNG and damp air flows must be balanced so that the working fluid remains in the liquid phase and at a controlled temperature.

In order to increase the energy transfer coefficient, the internal evaporative surface of the evaporative condenser tubes or chambers can be covered, at least in part, with a capillary structure in the form of microslots, microgrooves, sintered wick or other capillary structure in which the liquid-gas interface of the working fluid curves and flows orderly within the capillary structure without forming liquid films so that the evaporation occurs in a capillary evaporation regime. Since it is a working fluid without impurities or mineral precipitation problems, there are no risks of blocking the various forms of capillary structures.

In order to increase the energy transfer coefficient, the external condensing surface of the evaporative condenser tubes or chambers can be covered, at least in part, with a capillary structure in the form of microslots, microgrooves, sintered wick, or other capillary structure in which the gas-liquid interface of the condensed water curves and flows orderly within the capillary structure without forming water films, so that condensation occurs in a capillary condensation regime.

In order to increase the energy transfer coefficient, the external condensing surface of the cryogenic tube 3 can be covered at least in part with fins to increase the exchange surface and can be covered at least in part with a capillary structure on which the working fluid condenses in a capillary condensation regime.

Figure 2:
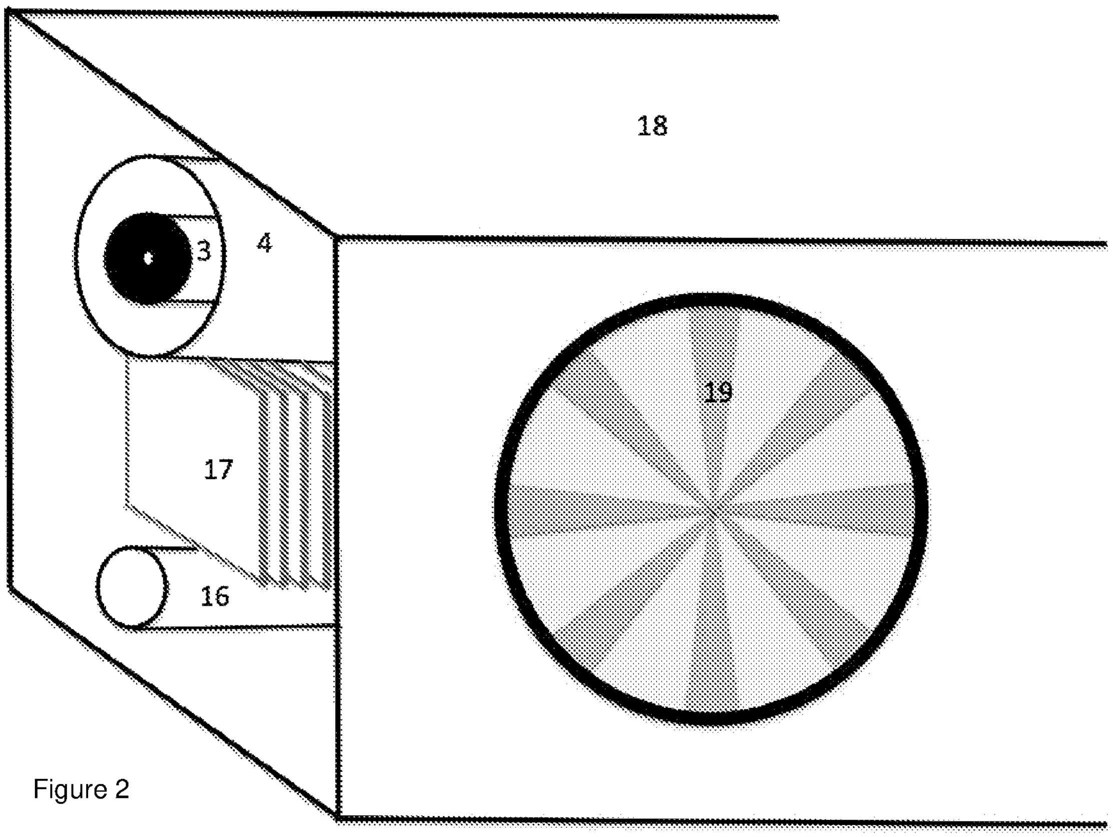
FIG. 2 shows a diagram of a regasification device with evaporative condenser chambers inside a container with at least one fan, blower or turbine to drive damp air.

As shown in FIG. 2, one embodiment of the invention consists in arranging the evaporative condenser tubes or chambers 17 inside at least one structure 18 with at least one fan, blower or turbine 19 that drives a flow of damp air 8 on the external evaporative surface of the evaporative condenser tubes or chambers 17.

Figure 3:
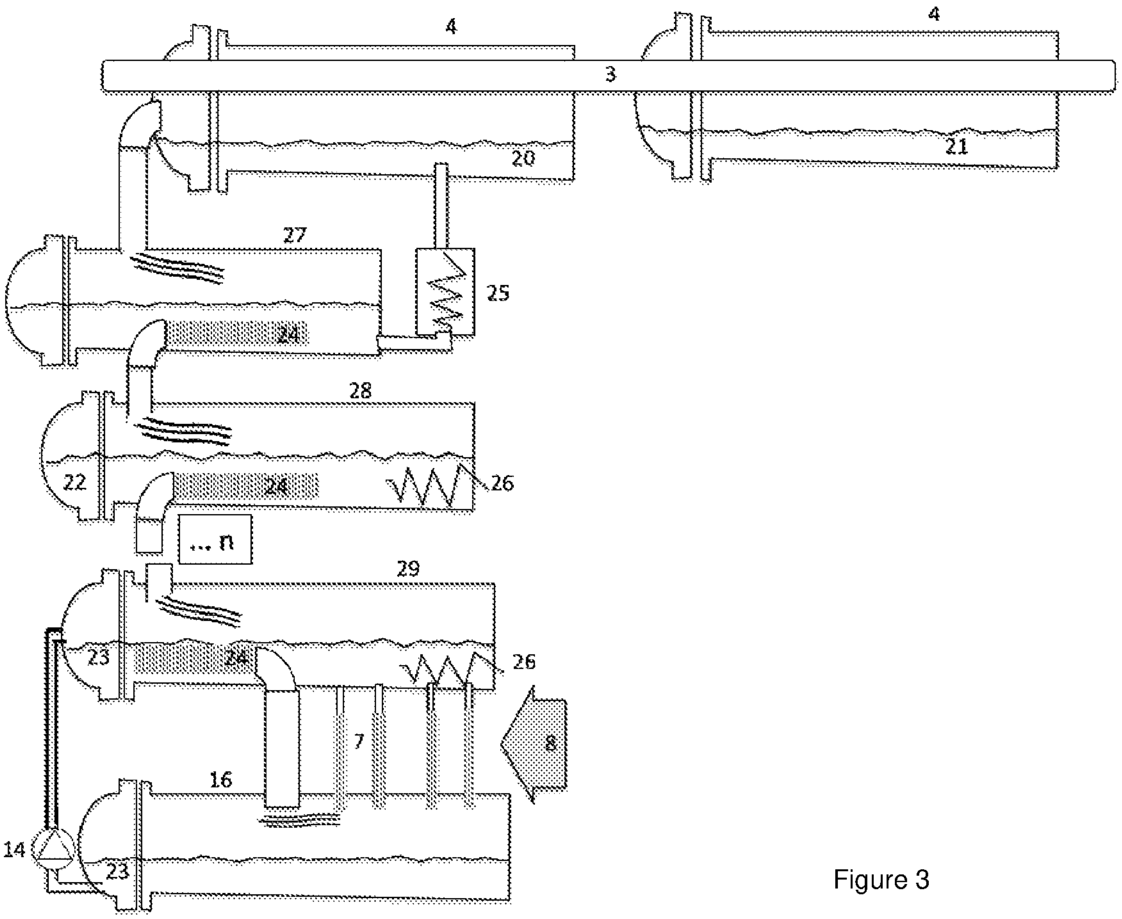
FIG. 3 shows a longitudinal cross section of a schematic representation of a regasification device with intermediate heat pipes.

As shown in FIG. 3, the regasification device can be made up of more than one casing 4 placed consecutively around at least one cryogenic tube 3 so that inside each casing 4 it is possible to work with a specific range of temperatures and with different working fluids 20, 21 adapted to each temperature range.

To prevent the formation of ice on the external surface of the at least one LNG cryogenic tube 3, at least one heat pipe 27, 28, 29 can be inserted. The at least one heat pipe 27, 28, 29 can contain different working fluids 20, 22, 23.

The at least one heat pipe 27, 28, 29 can incorporate an internal or external sensitive heat exchanger 25, 26 to control the temperature of the working fluid 20, 22, 23.

The at least one heat pipe 27 comprises at least one external evaporative surface and one internal condensing surface 24 that evaporates the working fluid 20 and the evaporated gaseous phase is supplied at a controlled temperature inside the casing 4, the working fluid 20 being a two-phase working fluid with a solidification point below the temperature of the external surface of the at least one cryogenic tube 3, so that the solid phase of the working fluid cannot accumulate on the external surface of the cryogenic tube 3 and the temperature of the gaseous phase of the working fluid that is supplied to the external surface of the cryogenic tube 3 is controlled.

Next, n heat pipes 28 can be inserted with their working fluid 22 corresponding to their range of working temperatures and sensitive heat exchange systems 26 to create a progressive gradient of working temperatures in which the working fluid does not solidify.

At the end of this insertion of at least one heat pipe, the working fluid in liquid phase 23 that is supplied to the internal evaporative surface of the evaporative condenser tubes or chambers 7 on whose external surface the water vapor of the damp air 8 condenses is at a temperature above 0° C. which guarantees that the condensed water on the external surface of each evaporative condenser tube or chamber 7 does not freeze.

The invention claimed is:

1. A regasification device for the regasification of liquefied natural gas (LNG) and the cogeneration of water and air, the regasification device comprising:

at least one casing hermetically sealed from the exterior which withstands vacuum conditions and that contains a working fluid in its liquid and gaseous phases;

at least one cryogenic tube which traverses the at least one casing and through which liquefied natural gas is fed via one end thereof and regasified natural gas is collected via the other end thereof, wherein an external surface of the at least one cryogenic tube is a condensing surface and the gaseous phase of the working fluid condenses thereupon being converted into the liquid phase of the working fluid; and a plurality of evaporative condenser tubes or chambers which are outside the at least one casing and which are under vacuum interiorly, the evaporative condenser tubes or chambers having an external condensing surface and an internal evaporating surface, wherein the external condensing surface of the evaporative condenser tubes or chambers is in contact with atmospheric air such that water vapor contained in the atmospheric air condenses on the external condensing surface of the evaporative condenser tubes or chambers, thereby being converted into condensed water and releasing energy, and wherein the internal evaporative surface of the evaporative condenser tubes or chambers, on which the liquid phase of the working fluid fed from the at least one casing flows and evaporates, by absorbing the released energy, transforms the liquid phase of the working fluid into the gaseous phase of the working fluid, which exits through one end of the evaporative condenser tubes or chambers and is directed into the at least one casing for the condensation thereof.

2. The regasification device according to claim 1, further comprising at least one fan, blower, or turbine which drives the atmospheric air on the external condensing surface of the evaporative condenser tubes or chambers.

3. The regasification device according to claim 1, wherein the evaporative condenser tubes or chambers have their internal evaporative surface covered, at least in part, with a first capillary structure in the form of microslots, microgrooves, or sintered wicks in which a gas-liquid interface of the working fluid curves and flows orderly within the first capillary structure without forming liquid films and wherein the evaporative condenser tubes or chambers have their external condensing surface covered, at least in part, with a second capillary structure in the form of microslots, microgrooves, or sintered wicks in which the gas-liquid interface of the condensed water curves and flows orderly within the second capillary structure without forming water films.

4. The regasification device according to claim 1, wherein the external condensing surface of the at least one cryogenic tube is covered, at least in part, with fins to increase the exchange surface or with a capillary structure on which the working fluid condenses in a capillary condensation regime.

5. The regasification device according to claim 1, wherein the external condensing surface of the at least one cryogenic tube is covered, at least in part, with a capillary structure on which the working fluid in gaseous phase condenses in a capillary condensation regime.

6. The regasification device according to claim 2, wherein the regasification device is inside at least one structure having at least one fan, blower, or turbine to direct the flow of the atmospheric air onto the evaporative surface of the evaporative condenser tubes or chambers.

7. The regasification device according to claim 1, wherein the at least one casing is a plurality of casings with a specific working fluid to work within a specific working temperature range above its solidification temperature.

8. The regasification device according to claim 1, further comprising at least one heat pipe inserted between the at least one casing and the at least one hermetic container under vacuum conditions, and the at least one heat pipe contains a specific two-phase working fluid with a solidification point at a temperature lower than a range of working temperatures of the at least one heat pipe.

9. The regasification device according to claim 8, wherein the at least one heat pipe incorporates or is connected to a sensitive heat exchanger to control the temperature of the working fluid.

10. The regasification device according to claim 8, wherein the at least one heat pipe includes at least one evaporative tube on its external surface and a condenser on its internal surface that evaporates the working fluid, and the evaporated gaseous phase is supplied at a controlled temperature inside the at least one casing, the working fluid being a two-phase working fluid with a solidification point below the temperature of the external surface of the at least one cryogenic tube.

11. The regasification device according to claim 1, further comprising a supply control system configured to dose (i) liquified natural gas to the at least one cryogenic tube and (ii) the working fluid in its gaseous phase to the at least one casing so that there is a thermal gradient up to a controlled temperature inside a wall of the at least one cryogenic tube.

12. The regasification device according to claim 1, further comprising an external collection container configured to accumulate the condensed water from the external condensing surface of the evaporative condenser tubes or chambers.

13. The regasification device according to claim 1, further comprising a hermetic container which is under vacuum conditions and which is connected to the one end of the evaporative condenser tubes or chambers and is configured to collect and accumulate (i) the gaseous phase of the working fluid evaporated on the internal evaporative surface of the evaporative condenser tubes or chambers and (ii) a remaining portion of the working fluid in the liquid phase not evaporated.

14. The regasification device according to claim 13, further comprising a pipe connecting the hermetic container to the at least one casing, the pipe being configured to direct the gaseous phase of the working fluid evaporated on the internal evaporative surface of the evaporative condenser tubes or chambers from the hermetic container to the at least one casing where the gaseous phase of the working fluid condenses again on the external condensing surface of the at least one cryogenic tube.

15. The regasification device according to claim 13, further comprising a pump configured to pump the working fluid in the liquid phase not evaporated that is accumulated inside the hermetic container to the interior of the at least one casing.

* * * * *